United States Patent
Biles et al.

(10) Patent No.: US 9,215,144 B2
(45) Date of Patent: Dec. 15, 2015

(54) RECOMMENDING A POLICY FOR AN IT ASSET

(71) Applicant: International Business Machines Corporation, Armonk, NY (US)

(72) Inventors: Nathan P. Biles, Rochester, MN (US); Jacob Kugel, Rochester, MN (US); Matthew C. Riedemann, Rochester, MN (US); Brian O. Wood, Eagan, MN (US)

(73) Assignee: International Business Machines Corporation, Armonk, NY (US)

(*) Notice: Subject to any disclaimer, the term of this patent is extended or adjusted under 35 U.S.C. 154(b) by 411 days.

(21) Appl. No.: 13/654,565

(22) Filed: Oct. 18, 2012

(65) Prior Publication Data

US 2014/0115134 A1   Apr. 24, 2014

(51) Int. Cl.
*G06F 15/16* (2006.01)
*G06F 15/173* (2006.01)
*H04L 12/24* (2006.01)

(52) U.S. Cl.
CPC ........ *H04L 41/0856* (2013.01); *H04L 41/0893* (2013.01)

(58) Field of Classification Search
USPC ....................................................... 709/217
See application file for complete search history.

(56) References Cited

U.S. PATENT DOCUMENTS

| | | | |
|---|---|---|---|
| 5,797,128 A | 8/1998 | Birnbaum | |
| 7,120,680 B1 | 10/2006 | Higgins et al. | |
| 7,894,372 B2 | 2/2011 | Chu et al. | |
| 8,285,874 B2 | 10/2012 | Salmi et al. | |
| 8,639,783 B1* | 1/2014 | Bakke et al. | 709/220 |
| 8,918,439 B2* | 12/2014 | Alatorre et al. | 707/827 |
| 2002/0083169 A1 | 6/2002 | Aki et al. | |
| 2004/0267897 A1* | 12/2004 | Hill et al. | 709/217 |
| 2005/0010571 A1 | 1/2005 | Solotorevsky et al. | |
| 2005/0060537 A1 | 3/2005 | Stamos et al. | |
| 2005/0273851 A1 | 12/2005 | Raju Datla et al. | |
| 2006/0080417 A1 | 4/2006 | Boutboul et al. | |
| 2006/0120384 A1 | 6/2006 | Boutboul et al. | |
| 2006/0141995 A1 | 6/2006 | Purnadi et al. | |
| 2007/0006218 A1 | 1/2007 | Vinberg et al. | |
| 2007/0027972 A1 | 2/2007 | Agrawal et al. | |
| 2007/0107059 A1 | 5/2007 | Chasin et al. | |
| 2007/0192823 A1 | 8/2007 | Andersen et al. | |

(Continued)

FOREIGN PATENT DOCUMENTS

KR   20080095028 A   10/2008

OTHER PUBLICATIONS

Brodie, Al, IBM Systems Director, White Paper, Oct. 2011.

*Primary Examiner* — Emmanuel L Moise
*Assistant Examiner* — Mahran Abu Roumi
(74) *Attorney, Agent, or Firm* — Martin & Associates, LLC; Derek P. Martin

(57) ABSTRACT

When a policy for an IT asset is created in a system manager that manages one or more IT assets, other IT assets that are related to the selected IT asset are determined based on at least one relation criteria related to system topology. The system administrator is prompted to apply the same policy to the related systems. When the system administrator accepts the recommendation to apply the same policy to the related systems, a system group is defined that includes the selected computer system and the related systems, and the system group and its corresponding policy are displayed to the system administrator.

2 Claims, 4 Drawing Sheets

(56) References Cited

U.S. PATENT DOCUMENTS

| | | |
|---|---|---|
| 2007/0239793 A1 | 10/2007 | Tyrrell et al. |
| 2007/0250628 A1* | 10/2007 | Katoh et al. ................. 709/225 |
| 2007/0282981 A1 | 12/2007 | Cohen et al. |
| 2007/0282986 A1 | 12/2007 | Childress et al. |
| 2008/0195369 A1 | 8/2008 | Duyanovich et al. |
| 2009/0171705 A1* | 7/2009 | Bobak et al. ....................... 705/7 |
| 2009/0172671 A1* | 7/2009 | Bobak et al. ................. 718/100 |
| 2009/0172776 A1* | 7/2009 | Makagon et al. ................. 726/2 |
| 2009/0240726 A1 | 9/2009 | Carter et al. |
| 2010/0094981 A1 | 4/2010 | Cordray et al. |
| 2011/0022706 A1 | 1/2011 | Borghetti et al. |
| 2011/0307291 A1 | 12/2011 | Rolia et al. |
| 2012/0069749 A1 | 3/2012 | Famolari et al. |
| 2012/0117215 A1 | 5/2012 | Van Broeck et al. |
| 2013/0111033 A1* | 5/2013 | Mao et al. ..................... 709/226 |
| 2013/0325997 A1 | 12/2013 | Higgins et al. |
| 2014/0052838 A1 | 2/2014 | Giacomoni et al. |
| 2014/0074921 A1* | 3/2014 | Poornachandran et al. .. 709/204 |

* cited by examiner

RECOMMENDING A POLICY FOR AN IT ASSET

BACKGROUND

1. Technical Field

This disclosure generally relates to computer systems, and more specifically relates to management of networked computer systems.

2. Background Art

Many networked computer system include a large number of different devices, including computer systems, routers, network switches, racks, communication links, etc., that are interconnected using a variety of different networks, including local area networks, wide area networks, and the Internet. The devices in a networked computer system are often referred to as Information Technology (IT) assets. Management of IT assets in a complex networked computer system requires significant effort by highly-skilled system administrators.

Various network management tools have been developed to make the job of a system administrators easier. For example, Systems Director is a software tool developed by IBM that helps system administrators by combining management functions for all IT assets into a central console, with automated discovery, monitoring and management of IT assets and workloads.

BRIEF SUMMARY

When a policy for an IT asset is created in a system manager that manages one or more IT assets, other IT assets that are related to the selected IT asset are determined based on at least one relation criteria related to system topology. The system administrator is prompted to apply the same policy to the related systems. When the system administrator accepts the recommendation to apply the same policy to the related systems, a system group is defined that includes the selected computer system and the related systems, and the system group and its corresponding policy are displayed to the system administrator.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 4:
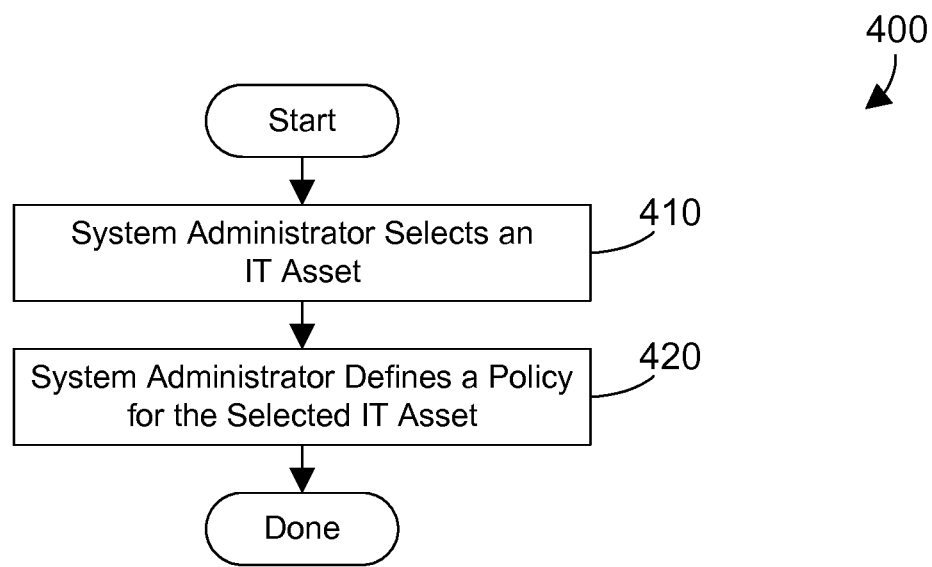
FIG. 4 is a flow diagram of a prior art method for a system administrator to define a policy for a selected IT asset.

Systems Director is a software tool developed by IBM that helps system administrators by combining management functions for all IT assets into a central console, with automated discovery, monitoring and management of IT assets and workloads. Using Systems Director, a system administrator can define policies that govern management of a selected IT asset. For example, one suitable type of policy that Systems Director supports is an update policy, which specifies which software on an IT asset must be kept current. Referring to FIG. 4, method 400 is a prior art method for defining a policy for a selected IT asset. Prior art method 400 is implemented within the Systems Director software tool developed by IBM. The system administrator selects an IT asset (step 410). The system administrator then defines a policy for the selected IT asset (step 420). Method 400 is then done. Using method 400 in a repetitive manner, a system administrator may define many policies one-at-a-time that each manage an IT asset.

The disclosure and claims herein recognize a system manager may have information that allows for more efficient creation of policies for IT assets in a networked computer system. When a policy for an IT asset is created in a system manager that manages one or more IT assets, other IT assets that are related to the selected IT asset are determined based on at least one relation criteria related to system topology. The system administrator is prompted to apply the same policy to the related systems. When the system administrator accepts the recommendation to apply the same policy to the related systems, a system group is defined that includes the selected computer system and the related systems, and the system group and its corresponding policy are displayed to the system administrator.

Figure 1:
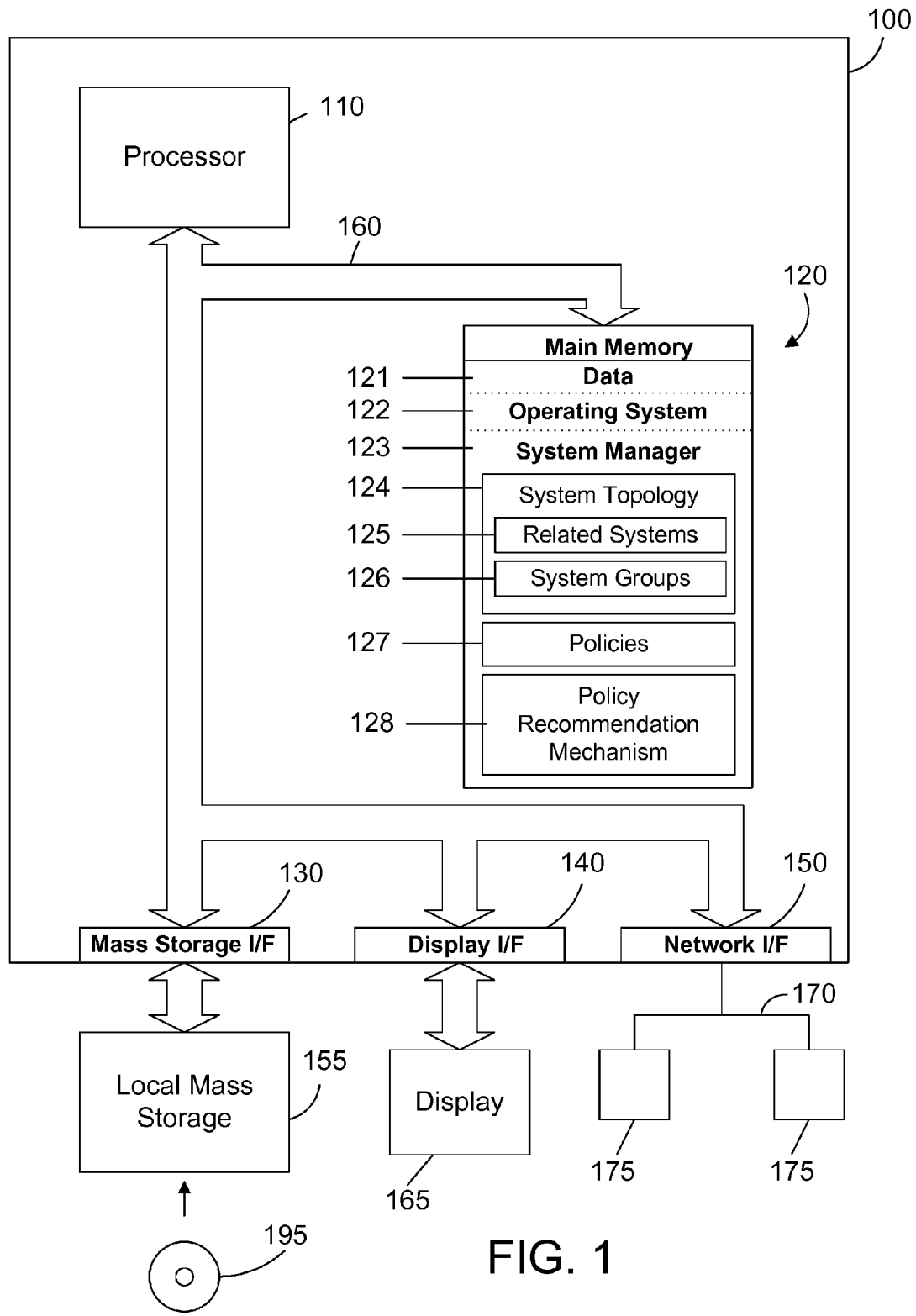
FIG. 1 is a block diagram of an apparatus that includes a system manager that has a policy recommendation mechanism.

Referring to FIG. 1, a computer system 100 is one suitable implementation of a server computer system that includes a system manager. Server computer system 100 is an IBM zEnterprise System computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, and a system manager 123. Data 121 represents any data that serves as input to or output from any program in computer system 100. Operating system 122 is a multitasking operating system. System manager 123 is a software tool for managing IT assets on a networked computer system. System manager 123 includes system topology 124, one or more policies 127, and a policy recommendation mechanism 128. From the system topology 124, the system manager may determine related systems 125 using any suitable relation criteria. In addition, the system manager 123 can define system groups 126. System groups 126 may include groups that share a policy 127. Policy recommendation mechanism 128 detects when a system administrator creates a policy 127 for a selected IT asset, and in response, determines related IT assets based on one or more relation criteria. The policy recommendation mechanism 128 then prompts the system administrator to determine whether the system administrator wants to apply the policy that was just created for the selected IT asset to related systems as well. When the system administrator accepts the recommendation to apply the policy to the related systems as well, the system manager creates a system group 126 that includes the selected IT asset and one or more related IT asset(s), and displays the system group 126 with the corresponding policy 127 to the system administrator. In this manner creation of policies is simplified because a policy created for one IT asset can be recommended and applied to related IT assets without requiring the system administrator manually and iteratively create a policy for each of the related IT assets.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122 and system manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the system manager 123.

Although computer system 100 is shown to contain only a single processor and a single system bus, those skilled in the art will appreciate that a system manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 thus connects the apparatus 100 to other IT assets (e.g., 175 in FIG. 1) in a networked computer system. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
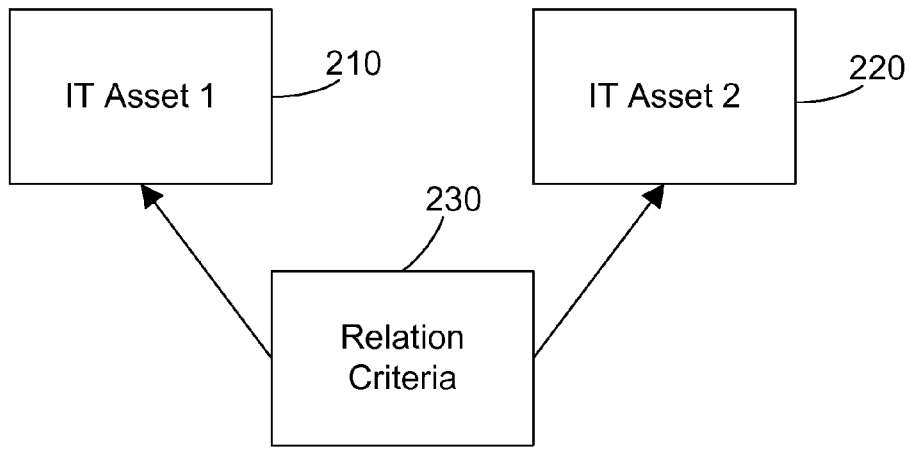
FIG. 2 is a block diagram showing two IT assets that are related by one or more specified relation criteria.
Figure 3:
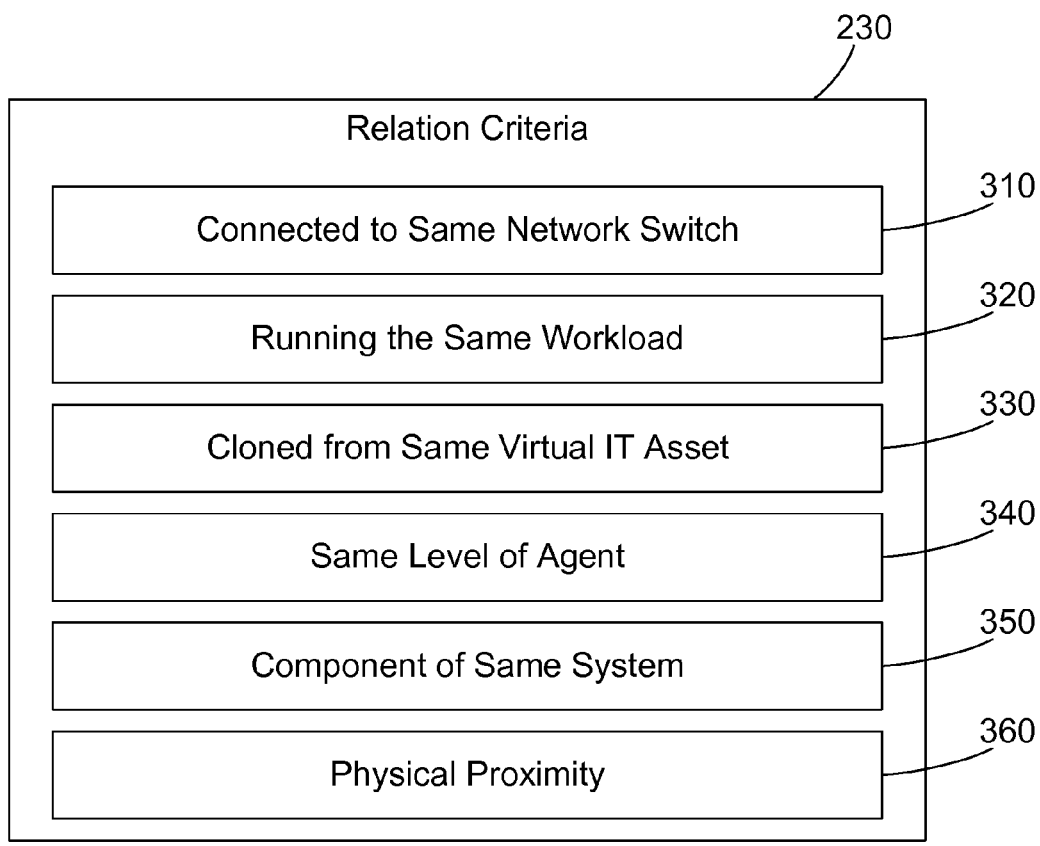
FIG. 3 is a block diagram showing sample relation criteria.

Referring to FIG. 2, a block diagram illustrates two IT assets 210 and 220 in a networked computer system that are related by one or more relation criteria 230. The relation criteria 230 is preferably based on information in the system topology 124. Suitable examples of relation criteria 230 are shown in FIG. 3 to include: connected to the same network switch 310, running the same workload 320, cloned from the same virtual IT asset 330, running a same level of agent 340, being a component of the same system 350, and physical proximity 360. Connected to the same network switch 310 means IT assets that are connected to the same network switch are related. Running the same workload 320 means IT assets running the same workload are related. Cloned from the same virtual IT asset 330 means IT assets that were cloned from the same virtual IT asset are related. Running a same level of agent 340 means IT assets that are running the same level of the system manager agent are related. Being a component of the same system 350 means IT assets that are components or subcomponents of the same system are related. For example, if a policy is created for a system that includes subcomponents, such as a BladeCenter, the policy could be recommended for all the subcomponents of the BladeCenter as well. In the alternative, if a policy is created for a subcomponent of a BladeCenter, the policy could be recommended for all the other subcomponents of the BladeCenter as well. Physical proximity 360 means IT assets that are in physical proximity to each other. Of course, the specific relation criteria shown in FIG. 2 are examples, and any suitable relation criteria that could be used to relate IT assets are within the scope of the disclosure and claims herein. For example, the relation criteria could specify the minimum number of related IT assets that must exist for the system administrator to be prompted. This could help reduce recommendations that might apply to only one or two IT assets.

Figure 5:
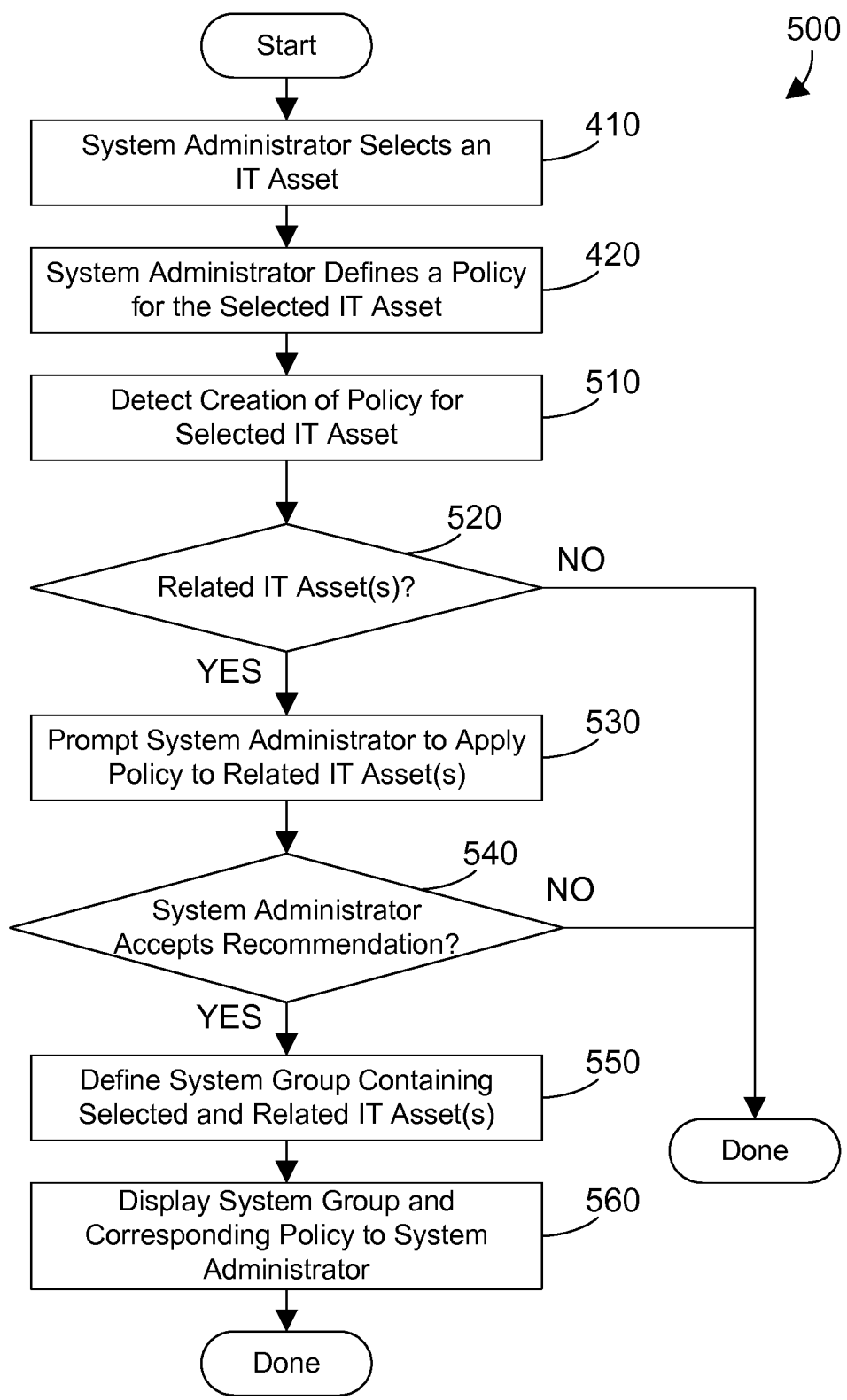
FIG. 5 is a flow diagram of a method for recommending a policy for a selected IT asset be applied to related IT assets.

Referring to FIG. 5, a method 500 begins with a system administrator selecting an IT asset (step 410). The system administrator defines a policy for the selected IT asset (step 420). Note that steps 410 and 420 are the same steps performed in prior art method 400 shown in FIG. 4. The creation of the policy for the selected IT asset in step 420 is detected (step 510). If there are one or more IT assets that are related to the selected IT asset (step 520=YES), the system administrator is prompted to apply the newly-created policy to the related IT asset(s) (step 530). When the system administrator accepts the recommendation (step 540=YES), a system group is defined that contains the selected IT asset and the related IT assets (step 550). The system group and corresponding policy are then displayed to the system administrator (step 560). Method 500 is then done. When there are no related IT assets (step 520=NO) or when the system administrator does not accept the recommendation (step 540=NO), method 500 is done. Method 500 thus recommends to a system administrator to apply a newly-created policy to any related IT assets.

An example will illustrate. Let's assume a system administrator creates a policy for a selected computer system (IT asset). Let's further assume that three other computer systems are connected to the same network switch, which satisfies relation criterion 310 shown in FIG. 3. Upon detecting the creation of the policy, a prompt is sent to the system administrator indicating the three other computer systems are related by being connected to the same network switch, and asking the system administrator if he or she desires to apply the policy that was just created to these other three computer systems as well. If the system administrator accepts the recommendation, a system group is defined that includes the selected computer system and the three related computer systems, and this system group of four computer systems and the policy that was applied to all four is displayed to the system administrator. This helps the system administrator by identifying IT assets that are potentially similar, and allowing the system administrator to specify the same policy for the similar IT assets without having to manually re-create the same policy for each related IT asset. Similar examples could use any of the other relation criteria 320-360 shown in FIG. 3, and one skilled in the art will appreciate that other relation criteria not shown in FIG. 3 could also be used.

While the specific example in FIG. 5 assumes the detection of the creation of a policy in step 520, then performs steps 520-560 in response to detecting creation of the policy, another mode of operation is possible. For example, the policy recommendation mechanism 128 could run periodically, could examine existing policies, and could then create recommendations to one or more system administrators for policies that could be applied to other IT assets. These recommendations could be in the form of a message or e-mail to a system administrator. The disclosure and claims herein expressly extend to a policy recommendation mechanism that determines IT assets related to a selected IT asset, and recommends to a system administrator to apply a policy for the selected IT asset to the related IT assets as well.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

When a policy for an IT asset is created in a system manager that manages one or more IT assets, other IT assets that are related to the selected IT asset are determined based on at least one relation criteria related to system topology. The system administrator is prompted to apply the same policy to the related systems. When the system administrator accepts the recommendation to apply the same policy to the related systems, a system group is defined that includes the selected computer system and the related systems, and the system group and its corresponding policy are displayed to the system administrator.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a network interface that couples the apparatus to a plurality of information technology (IT) assets in a networked computer system;
a system manager residing in the memory and executed by the at least one processor, the system manager managing the plurality of IT assets in the networked computer system, the system manager allowing a system administrator to create a policy for a selected IT asset that defines how the selected IT asset is managed by the system manager; and
a policy recommendation mechanism that detects when the policy for the selected IT asset is created, dynamically determines after the policy for the selected IT asset is created at least one related IT asset based on at least one relation criterion that the at least one related IT asset has in common with the selected IT asset, the at least one relation criterion comprising:
connection to the same network switch;
running the same workload;
cloned from the same virtual server;
running a same level of agent;
components of the same system; and
physical proximity;
wherein the policy recommendation mechanism prompts the system administrator with a recommendation to apply the policy to the at least one related IT asset that the at least one related IT asset has in common with the selected IT asset, wherein, when the system administrator accepts the recommendation to apply the policy to the at least one related IT asset, the system manager defines a system group containing the selected IT asset and the at least one related IT asset and displays the system group and the policy to the system administrator.

2. An apparatus comprising:
at least one processor;
a memory coupled to the at least one processor;
a network interface that couples the apparatus to a plurality of information technology (IT) assets in a networked computer system; and
a system manager residing in the memory and executed by the at least one processor, the system manager managing the plurality of IT assets in the networked computer system, the system manager allowing a system administrator to create a policy for a selected IT asset that defines how the selected IT asset is managed by the system manager;
a policy recommendation mechanism that detects when the policy for the selected IT asset is created, dynamically determines after the policy for the selected IT asset is created at least one related IT asset based on at least one relation criterion the at least one related IT asset has in common with the selected IT asset, the at least one relation criterion comprising:
connection to the same network switch;
running the same workload;
cloned from the same virtual server;
running a same level of agent;
components of the same system; and
physical proximity;
wherein the policy recommendation mechanism prompts the system administrator with a recommendation to apply the policy to the at least one related IT asset, wherein, when the system administrator accepts the recommendation to apply the policy to the at least one related IT asset, the system manager defines a system group containing the selected IT asset and the at least one related IT asset and displays the system group and the policy to the system administrator.

* * * * *